United States Patent [19]
Tsuruta et al.

[11] 3,770,354
[45] Nov. 6, 1973

[54] PHOTOELECTRIC PHOTOMETER

[75] Inventors: Hisao Tsuruta; Norihiko Kiyose, both of Kyoto, Japan

[73] Assignee: Yanagimoto Seisakusho Co., Ltd., Kyoto, Japan

[22] Filed: June 30, 1971

[21] Appl. No.: 158,444

[30] Foreign Application Priority Data
July 4, 1970 Japan................................ 45/58437

[52] U.S. Cl.................. 356/178, 356/206, 250/218
[51] Int. Cl......................... G01j 3/46, G01n 21/22
[58] Field of Search.................... 356/178, 206, 184, 356/186; 250/218

[56] References Cited
UNITED STATES PATENTS
3,210,552   10/1965   Young................................ 356/178
3,580,683   5/1971   Schulkind........................... 356/186
3,582,664   6/1971   Hrdino............................... 356/186

Primary Examiner—David Schonberg
Assistant Examiner—Conrad Clark
Attorney—Irvin M. Weiner

[57] ABSTRACT

A photoelectric photometer for light absorption analysis in which a light beam passing through the sample cell is split into three beams of monochromatic light having different wavelengths which correspond to the wavelengths at the peak maximum, i.e., the beginning and the end of the absorption spectrum band, due to the constituent contained in the sample, and the light energy of the wavelength exhibiting the peak maximum is compared with a mean value of the light energies of the other two wavelengths, whereby the absorption degree of the constituent of the sample to be determined is indicated for direct reading.

2 Claims, 2 Drawing Figures

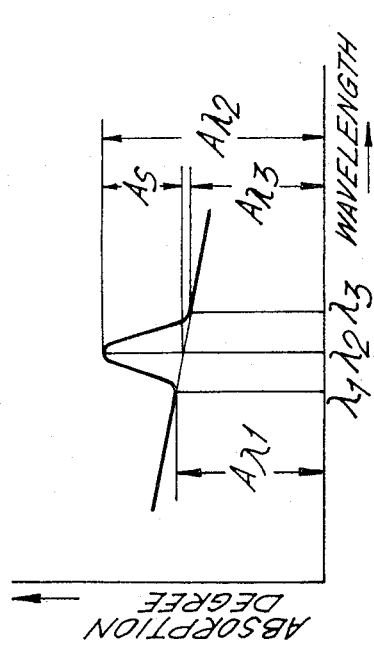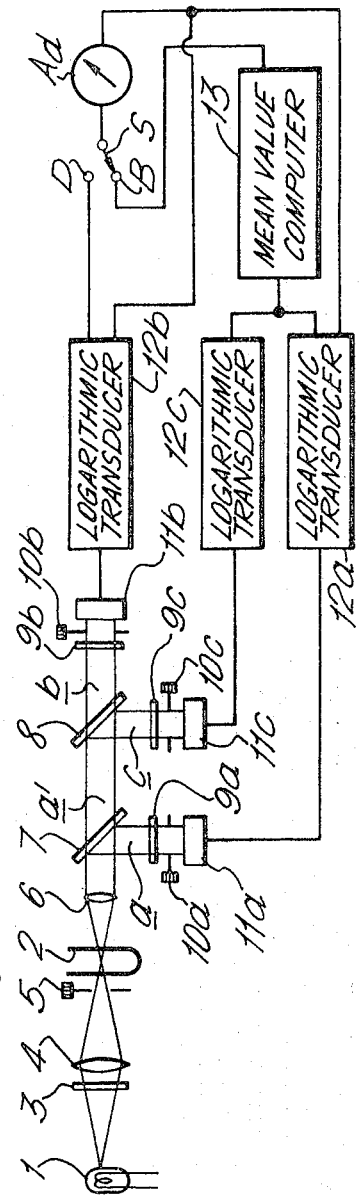

PHOTOELECTRIC PHOTOMETER

BACKGROUND OF THE INVENTION

This invention relates to an improved photoelectric photometer for light absorption analysis, and more particularly to an improved photoelectric photometer for determinating the light absorption degree of a particular constituent contained in the sample liquid.

The sample concentration can be determined by measuring the transmission degree of the sample through the utilization of the absorption photometry and calculating the concentration by a proportional operation from the transmission degree measured. This calculation is carried out by the following formula base on the Lanbert-Beer's Law:

$$\log I_o / I = \mu l\, C \tag{1}$$

where $I_o$ : Intensity of monochromatic light incident on sample, $I$ : Intensity of light transmittted through sample,
$\mu$ : Absorption coefficient
$l$ : Length of sample, and
$C$ : Concentration of sample In the above formula, $\mu$ is a constant dependent on the sample constituent to be analyzed and $l$ is also constant if a sample cell having a fixed length is used. Accordingly, if the value of $I_o / I$ is measured, the concentration of sample C can be easily found from the formula (1). Hereinafter, the value of $\log I_o / I$ will be referred as "absorption degree."

In determining the absorption degree of a particular constituent included in the sample, consideration should be given to the influences due to the coexistent substances contained in the sample. Suppose that there is a sample exhibiting an absorption characteristic shown in FIG. 1 and that the absorption spectrum due to the constituent in the sample be analyzed is superposed on another absorption spectrum due to a coexistent substance contained in the sample. In FIG. 1 the spectrum band ranging 3 the wavelength $\lambda_1$, to the wavelength $\lambda_3$ and showing the maximum absorption at the wavelength $\lambda_2$ is the absorption spectrum due to the constituent in the sample to be analyzed. The absorption degree $As$ of the constituent to be determined can be calculated as follows:

$$As = A\,\lambda_2 - (A\,\lambda_1 + A\,\lambda_3)/2 \tag{2}$$

where $A\lambda_1$, $A\lambda_2$ and $A\lambda_3$ are the absorption degrees of the sample at the wavelengths $\lambda_1$, $\lambda_2$ and $\lambda_3$, respectively. $A\lambda_1$, $A\lambda_2$ and $A\lambda_3$ are then expressed as follows, respectively:

$$A\lambda_1 = \log I_o\lambda_1 / I\lambda_1 , \tag{3}$$

$$A\lambda_2 = \log I_o \lambda_2 / I\lambda_2 , \tag{4}$$

$$A\lambda_3 = \log I_o \lambda_3/ I\lambda_3 \tag{5}$$

where $I_o\lambda_1$, $I_o\lambda_2$ and $I_o\lambda_3$ are the intensities of the monochromatic light beams incident on the sample with the wavelengths $\lambda_1$, $\lambda_2$ and $\lambda_3$ respectively, and $I\lambda_1$, $I\lambda_2$ and $I\lambda_3$ are the intensities of the monochromatic light beams transmitted though the sample with the wavelengths $\lambda_1$, $\lambda_2$ and $\lambda_3$, respectively.

In order to determine the absorption degree As of the sample constituent from the formula (2) with use of a conventional photoelectric photometer which comprises a light source, a monochromator, a sample cell and a photoelectric cell, (a) the monochromator must be adjusted for three times, namely for the three different wavelengths $\lambda_1$, $\lambda_2$ and $\lambda_3$ ; (b) for each of the three wavelengths the sample cell is filled twice with the standard sample and the unknown sample; and (c) for each of the three wavelengths zero and 100 percent calibrations of the transmission or absorption degree are required, thus resulting in a considerably troublesome measuring operation.

The primary object of the invention is to provide a new and improved photoelectric photometer for light absorption analysis in which the absorption degrees of at least two different wavelengths can be determined at a time.

Another object of the invention is to provide a new and improved photoelectric photometer adapted to determine concentration of a particular constituent contained in the sample, in which the absorption degree of the constituent to be determined is directly indicated.

A further object of the invention is to provide an improved means for eliminating influences due to another absorption spectrum of any other substance contained in the sample in the absorption photometry.

SUMMARY OF THE INVENTION

The photoelectric photometer for light absorption analysis according to the invention comprises a sample cell, a light source for illuminating said sample cell, means for splitting the light beam from said sample cell into a plurality of light beams having their respective divisional optical paths, said optical paths including their respective monochromatic means therein so as to admit beams of monochromatic light having different wavelengths for different optical paths, respectively, said optical paths further including at their ends the respective photoelectric means for detecting their respective beams of monochromatic light, electrical means for determining the light absorption of the sample in said sample cell in response to the signals received by said photoelectric means in any of said optical paths, and means for selectively connecting any of said photoelectric means in said different optical paths to aid electrical means.

In a preferred embodiment of the invention the light beam from the sample cell is split into three light beams having their respective divisional optical paths. Means for splitting the light beam to three light beams may preferably comprise the first beam splitter for dividing the light beam from the sample cell into two light beams and the second beam splitter for dividing one of the two light beams divided by said first beam splitter into further two light beams, thereby obtaining three light beams having their respective divisional optical paths. hs.

The system of the invention may preferably include a diaphragm for controlling the luminous flux which illuminates the sample cell and another diaphragm in each of said divisional optical paths for controlling the light flux which enters into said photoelectric means of each of said optical paths. Preferably, the diaphragm for controlling the luminous flux illuminating the sample cell is operative so as to control the width of the luminous flux in one direction while said another diaphragm in each of said divisional optical paths is operative so as to control the width of the luminous flux in a direction perpendicular to said one direction.

The system of the invention may further include a mean value computer for obtaining a mean value of the two signals received by said photoelectric means in any two of said optical paths so that said mean value may be indicated at said electrical means. The three different wavelengths mentioned before should correspond to the wavelengths at which the absorption spectrum due to constituent of the sample to be analyzed appears as its beginning, end and maximum, respectively, and said means value computer provides a mean value of the two signals in the divisional optical paths of the light beams having the first two wavelengths.

Electrical means included in the system is usually an electric current indicator. The electric current indicator may preferably have a logarithmic scale. If the electric current indicator has a natural scale, means for converting values detected by each of said photoelectric means to logarithms should be included between each of said photoelectric means and the electric current indicator.

DESCRIPTION OF THE PREFERRED EMBODIMENTS

FIG. 1 is a graph showing, by way of example, the absorption characteristic of a sample to be analyzed in which two absorption spectra are superposed; and FIG. 2 is a diagramatic view of the photoelectric photometer embodying the invention.

DESCRIPTION OF THE PREFERRED EMBODIMENTS

Referring now more particularly to the drawings, the basic system of the device of the invention is illustrated in FIG. 2. A light source 1 illuminates the whole system. The light source 1 first illuminates a sample cell 2 through a heatproof filter 3, a condensor lens 4 and an adjustable diaphragm 5. The sample cell 2 comprises a transparent container for the liquid sample to be analyzed. The light beam leaving the sample cell 2 is made parallel by a condenser lens 6 and is then split by the first beam splitter 7 into two light beams which have their respective divisional optical paths, namely the first divisional optical path $a$ and the other optical path $a'$. The light beam of the other optical path $a'$ is then further divided by the second beam splitter 8 into two light beams having their respective divisional optical paths, namely the second and third divisional optical paths $b$ and $c$. Each of the three divisional paths $a$, $b$ and $c$ includes monochromatic means 9a, 9b, 9c, an adjustable diaphragm 10a, 10b, 10c, and, photoelectric means 11a, 11b, 11c. Monochromatic means 9a, 9b and 9c provide different wavelengths $\lambda_1$, $\lambda_2$ and $\lambda_3$ for the different divisional optical paths $a$, $b$, and $c$, respectively. It should be supposed that these three wavelengths $\lambda_1$, $\lambda_2$ and $\lambda_3$ are identical with those defined hereinbefore in the description referring to FIG. 1. Each of the monochromatic means 9a, 9b and 9c is preferably a filter although it may be a monochromator. The beams of monochromatic light from those monochromatic means 9a, 9b and 9c reach the respective photoelectric means 11a, 11b and 11c. The photoelectric means 11a, 11b and 11c may be photoelectric cells of any known type for detecting the respective beams of monochromatic light to produce photoelectric currents in response to the light energies received today.

In the optical system as described in the above, if the transmission or absorption factors of the sample with respect to the above mentioned three wavelengths $\lambda_1$, $\lambda_2$ and $\lambda_3$ are the same, the photoelectric means 11a, 11b and 11c must be of the same value. This can be achieved by controlling the diaphragms 10a, 10b and 10c so as to compensate for the differences in the quantity of light due to various factors, such as the nature of the light source 1, the transmission factors of the filters 9a, 9b and 9c, and the spectral sensitivies of the photoelectric means 11a, 11b and 11c. In addition, since this adjustment must be effective over the entire range of 0 to 100 percent opening of the diaphragm 5, in a preferred embodiment of the invention, the diaphragm 5 and each of the diaphragms 10a, 10b and 10c are so adjustable that the former controls the width of the light flux in one direction while the latter controls the width of the light flux in a perpendicular direction to said one direction of the former. The diaphragm 5 may be placed either before or after the sample cell 2. Each of the diaphragms 10a, 10b and 10c may be placed either before or after the filter, 9a, 9b, 9c.

Each of the photoelectric cells 11a, 11b and 11c produces an electric current in response to the light energy received by each of items. The output electric current produced at each of the photoelectric cells 11a, 11b and 11c is fed to its own logarithmic transducer for converting the output electric current value to a logarithmic value. The output from the logarithmic transducer 12b is directly transmitted through the electrical contact D and the changeover switch S to an indicating anmeter A$d$. The outputs from the logarithmic transducers 12a and 12c are fed to a mean value computer 13 to calculate a mean value of the two outputs therefrom and the mean value is then transmitted through an electrical contact B and the changeover switch S to the indicating ammeter A$d$ for direct reading.

Consideration will now be given to how the absorption degree As of the particular constituent of the sample can be directly indicated by the indicating anmeter A$d$.

Now, suppose that in the before-mentioned formula (2) the mean value of $\lambda_1$, and $\lambda_2$ is $\lambda a$, the absorption degree As to be obtained is given by the following formula:

$$A\text{s} = \log I_o\, \lambda_2/I\, \lambda_2 - \log I_o\, \lambda a/I\, \lambda\, a \quad (6)$$

Science $I_o\, \lambda_2$ can be controlled by the adjustment of the diaphragms 5, 10a, 10b and 10c so as to be equal to $I_o\, \lambda a$, the absorption degree As may be expressed as follows:

$$A\text{s} = \log I\, \lambda a\, /\, I\, \lambda_2 \quad (7)$$

This means that in the photoelectric current measuring circuit, if the changeover switch S is thrown to the B side, then the mean value of the light energies at the wavelengths $\lambda_1$ and $\lambda_2$, that is, the second term on the right side of the formula (2) is indicated. If the switch S is thrown to the D side, then the absorption of the wavelength $\lambda_2$, that is, the first term on the right side of the formula (2) is indicated. Therefore, in FIG. 2 if the aperture of the diaphragm 5 is so controlled that a reading on the ammeter Ad when the switch S is thrown to the B side will indicate a 100 percent transmission degree (0 percent absorption degree), the ammeter Ad will be able to directly indicate the absorption degree As when the switch is thrown to the D side.

We claim:

1. A photoelectric photometer for determining the absorption degree of a particular constituent included in a sample cell, comprising, in combination:

a sample cell;

a light source for illuminating said sample cell;

means for splitting the light beam transmitted through said sample cell into three beams having respective divisional optical paths;

means disposed in said divisional optical paths for admitting beams of light having different predetermined wavelengths for the different respective divisional optical paths, said three different wavelengths corresponding to the wavelengths at which the absorption spectrum band due to said particular constituent in the sample to be analyzed appears as its opposite ends and its peak point;

a first photoelectric means disposed at the end of the optical path for detecting the light beam having the wavelength corresponding to that of one of said opposite ends of said absorption spectrum band of said particular constituent;

a second photoelectric means disposed at the end of the optical path for detecting the light beam having the wavelength corresponding to that of the other of said opposite ends of said absorption spectrum band of said particular constituent;

a third photoelectric means disposed at the end of the optical path for detecting the light beam having the wavelength corresponding to that of said peak point of said absorption spectrum band of said particular constituent;

an adjustable diaphragm in each of said divisional optical paths for controlling the luminous flux which enters into said photoelectric means of each of said optical paths;

electrical means for determining said absorption degree of said particular constituent included in said sample cell;

a first logarithmic transducing means electrically connected to the output of said first photoelectric means;

a second logarithmic transducing means electrically connected to the output of said second photoelectric means;

a third logarithmic transducing means electrically connected to the output of said third photoelectric means;

a mean value computer electrically connected to the outputs of said first and second logarithmic transducing means; and means for selectively electrically connecting the outputs of said third logarithmic transducing means and said mean value computer to said electrical means.

2. A photoelectric photometer as defined in claim 1, in which said diaphragm for controlling the luminous flux illuminating the sample cell is operative so as to control the width of the luminous flux in one direction while said another diaphragm in each of said divisional optical paths is operative so as to control the width of the luminous flux in a direction perpendicular to said one direction.

* * * * *